United States Patent
Yang et al.

(10) Patent No.: US 9,003,301 B2
(45) Date of Patent: Apr. 7, 2015

(54) IMAGE MANAGEMENT METHOD AND SYSTEM USING THUMBNAIL IN DLNA SYSTEM

(75) Inventors: Chan-Seok Yang, Seoul (KR); Ho-Chul Shin, Suwon-si (KR); Byung-Soo Lim, Seongnam-si (KR); Won-Suk Yang, Seoul (KR)

(73) Assignee: Samsung Electronics Co., Ltd (KR)

( * ) Notice: Subject to any disclaimer, the term of this patent is extended or adjusted under 35 U.S.C. 154(b) by 692 days.

(21) Appl. No.: 12/691,288

(22) Filed: Jan. 21, 2010

(65) Prior Publication Data

US 2010/0185987 A1 Jul. 22, 2010

(30) Foreign Application Priority Data

Jan. 21, 2009 (KR) .................. 10-2009-0004992

(51) Int. Cl.
  *G06F 3/00* (2006.01)
  *G06F 3/048* (2013.01)
  *G06K 9/36* (2006.01)
  *G06F 17/30* (2006.01)
  *H04N 1/00* (2006.01)
  (Continued)

(52) U.S. Cl.
  CPC ......... *G06F 17/30274* (2013.01); *G06T 3/4038* (2013.01); *G06F 3/04817* (2013.01); *G06F 3/0482* (2013.01); *H04L 12/2812* (2013.01); *H04N 21/43615* (2013.01); *H04N 1/00204* (2013.01); *H04N 1/00244* (2013.01); *H04N 1/00347* (2013.01); *H04N 1/32117* (2013.01); *H04N 2201/0015* (2013.01);
  (Continued)

(58) Field of Classification Search
  CPC .......... G06F 17/30274; G06F 3/04817; G06F 3/0482; H04L 12/2812; H04N 1/32117; H04N 2201/0087; H04N 2201/0089; H04N 2201/325; H04N 2201/3278; H04N 21/43615; G06T 3/4038
  USPC ................... 382/284; 715/748, 835, 837, 838
  See application file for complete search history.

(56) References Cited

U.S. PATENT DOCUMENTS

2003/0122940 A1* 7/2003 Myojo ........................ 348/231.2
2004/0044587 A1* 3/2004 Schwartzman ................. 705/27
(Continued)

FOREIGN PATENT DOCUMENTS

KR   1020070037914   4/2007

OTHER PUBLICATIONS

Heredia, Edwin, "An Overview of the DLNA Architecture," Microsoft Corporation, 2008, retrieved from http://download.microsoft.com/download/f/0/5/f05a42ce-575b-4c60-82d6-208d3754b2d6/DLNA_Part_1_RS08.pptx on May 13, 2014.*

(Continued)

*Primary Examiner* — Eric J Bycer
(74) *Attorney, Agent, or Firm* — The Farrell Law Firm, P.C.

(57) ABSTRACT

An image management method and system are disclosed which can increase user convenience by reducing a display time of thumbnails in a DLNA system. The DLNA system includes a digital media server for generating a thumbnail group image using thumbnails corresponding to at least one original image file and transmitting the thumbnail group image, and a digital media player for receiving the thumbnail group image from the digital media server and requesting the digital media server to transmit an original image file corresponding to a selected thumbnail among thumbnails included the thumbnail group image.

10 Claims, 5 Drawing Sheets

(51) Int. Cl.
  *G06T 3/40* (2006.01)
  *G06F 3/0481* (2013.01)
  *G06F 3/0482* (2013.01)
  *H04L 12/28* (2006.01)
  *H04N 21/436* (2011.01)
  *H04N 1/32* (2006.01)

(52) U.S. Cl.
  CPC .............. *H04N 2201/0087* (2013.01); *H04N 2201/0089* (2013.01); *H04N 2201/325* (2013.01); *H04N 2201/3278* (2013.01)

(56) References Cited

U.S. PATENT DOCUMENTS

| | | | |
|---|---|---|---|
| 2004/0141211 A1* | 7/2004 | Furukawa | 358/450 |
| 2007/0065044 A1* | 3/2007 | Park et al. | 382/305 |
| 2007/0211728 A1* | 9/2007 | Kim et al. | 370/395.5 |
| 2007/0239668 A1* | 10/2007 | Shin et al. | 707/2 |
| 2008/0126543 A1* | 5/2008 | Hamada et al. | 709/225 |
| 2008/0176602 A1* | 7/2008 | Kim | 455/564 |
| 2008/0310763 A1* | 12/2008 | Senoo | 382/305 |
| 2009/0059288 A1* | 3/2009 | Mitsui | 358/1.15 |
| 2009/0106700 A1* | 4/2009 | Nobori et al. | 715/838 |
| 2009/0327241 A1* | 12/2009 | Douillet et al. | 707/3 |

OTHER PUBLICATIONS

Heredia, Edwin, "DLNA Device Implementation," Microsoft Corporation, 2008, retrieved from http://download.microsoft.com/download/f/0/5/f05a42ce-575b-4c60-82d6-208d3754b2d6/DLNA__Part_2_RS08.pptx on May 13, 2014.*

* cited by examiner

IMAGE MANAGEMENT METHOD AND SYSTEM USING THUMBNAIL IN DLNA SYSTEM

PRIORITY

This application claims priority under 35 U.S.C. §119(a) to a Korean Patent Application filed in the Korean Intellectual Property Office on Jan. 21, 2009 and assigned Serial No. 10-2009-0004992, the entire disclosure of which is hereby incorporated by reference.

BACKGROUND OF THE INVENTION

1. Field of the Invention

The present invention relates generally to an image management method and system using a thumbnail in a Digital Living Network Alliance® (DLNA) system, and more particularly, to an image management method and system which can increase user convenience by reducing a display time of a thumbnail in a DLNA system.

2. Description of the Related Art

DLNA conforms to standards of IEEE 802.3i, IEEE 802.3u, etc. for wired network connections and to standards of IEEE 802.11a/b/g for wireless network connections. In DLNA, a network layer uses Internet Protocol version 4 (IPv4) and a media transport layer uses HyperText Transfer Protocol (HTTP). DLNA is based on Universal Plug and Play (UPnP) which is a middleware employing protocol such as Internet Protocol (IP), Transmission Control Protocol (TCP), User Data Protocol (UDP), HTTP, and eXtensible Markup Language (XML). UPnP has a characteristic of enabling devices on a network to perform command and control functions with each other independent of a specific operating system, programming language, and media.

The UPnP Audio/Video (AV) standard defines four services: a connection manger service, a rendering control service, an AV transport service, and a content directory service.

The connection manager service allows a control point to use and manage a relationship between a source and a sink of content in order to select format and protocol. The control point refers to a device which is capable of discovering and controlling other devices. The connection manager service doesn't care if the control point is not aware of physical media connection techniques and allows the control point to select a source and a sink for reproducing the source.

The rendering control service controls sound and image characteristics. Most playback devices provide setting attributes that affect the playback of content and the rendering control service allows the control point to provide a function for controlling the playback attributes.

The AV transport service controls playback and recording. The AV transport service provides a mechanism for enabling the control point to control transmission of audio and video streams through functions such as play, stop, pause, etc.

The content directory service shows audio and video content and a metadata list. The control point uses the content directory service to search and store the audio and video content. The content directory may list various media types, such as songs stored on an MP3 player, slides of still images, movies stored in a DVD-juke box, TV schedules, etc.

In the content directory service, a method for dynamically generating thumbnails for image items and efficiently playing back the generated thumbnails through a control point or a media renderer has been described. In DLNA, thumbnails are provided mainly in an independent media format of JPEG_TN or PNG_TN.

The thumbnails refer to small-size images relative to original images and are used to simultaneously display a plurality of images or to preview the images. A thumbnail image has an advantage in that it is capable of rapidly obtaining information about an original image because the contents or features of the original image can be known without uploading the original image to a memory. Although a thumbnail cannot provide accurate information due to its image size or picture quality, efficiency of information display can be increased by a function of re-displaying an original image selected by an approximate information analysis result obtained through the thumbnail image.

In the existing DLNA standard, thumbnails are regarded as independent images in a media format of JPEG_TN or PNG_TN. Images on a digital media server are expressed as meta information in XML format, and information about locations capable of receiving images is recorded in the meta information together with information such as names and resolutions of the images. In this case, Uniform Resource Identifier (URI) information indicating the location of an original image and information indicating image information of thumbnails are added to the meta information. A client may download an original image file by accessing a corresponding URI and may display thumbnails on a screen.

The following Table 1 and Table 2 describe a thumbnail in a DLNA standard according to the prior art.

TABLE 1

7.3.55.3 If a UPnP AV MediaServer exposes thumbnail images for image or video content, then a UPnP AV MediaServer must provide a thumbnail that conforms to requirement JPEG_TN media format profile and be declared with the JPEG_TN designation in the fourth field of the res@protocolInfo attribute.

TABLE 2

7.3.55.5 A UPnP A/V Media Server must not expose a <res> element with a thumbnail media format profile ID (i.e. JPEG_TN, PNG_TN), without exposing at least one additional <res> element with a media format profile ID that is not one of the thumbnail media format profile IDs.

If a client desires to display an image list that is shared in a digital media server on a screen by using thumbnails, the client may request the digital media server to transmit a browse or search action provided in a content directory service and may receive XML documents including information about the image list. The client receives thumbnails by generating respective new network connections for all thumbnails to be displayed on a screen. However, if a network environment does not provide fast response time and large bandwidth capacity, displaying thumbnails consumes considerable time and causes user inconvenience.

SUMMARY OF THE INVENTION

An aspect of the present invention is to address at least the above-mentioned problems and/or disadvantages and to provide at least the advantages described below. Accordingly, an aspect of the present invention provides an image management method and system which can increase user convenience by reducing a display time of thumbnails in a DLNA system.

According to one aspect of the present invention, a DLNA system includes a digital media server for generating a thumbnail group image using thumbnails corresponding to at least one original image file, generating indexes for the thumbnails corresponding to the at least one original image file, and transmitting the thumbnail group image and the indexes upon receiving an image list request for the at least one original image file; and a digital media player for receiving the thumbnail group image and the indexes from the digital media server, displaying the thumbnail group image, and if any one of the thumbnails included in the thumbnail group image is selected, requesting the digital media server to transmit an original image file corresponding to the selected thumbnail.

According to another aspect of the present invention, an image management method in a DLNA system including a digital media server and a digital media player includes generating a thumbnail group image using thumbnails corresponding to at least one original image file by the digital media server; generating indexes for the thumbnails included in the thumbnail group image; transmitting the thumbnail group image and the indexes to the digital media player; receiving and displaying, by the digital media player, the thumbnail group image, and if any one of the thumbnails included in the thumbnail group image is selected, requesting the digital media server to transmit an original image file corresponding to the selected thumbnail; informing, by the digital media server, the digital media player of a URI in which the requested original image file is stored; and downloading, by the digital media player, the original image file by accessing the URI.

According to a further aspect of the present invention, an image management method by a digital media server in a DLNA system including the digital media server and a digital media player includes upon receiving an image list request from the digital media player, generating a thumbnail group image using thumbnails corresponding to at least one original image file; generating indexes corresponding to the thumbnails included in the thumbnail group image; transmitting the thumbnail group image and the indexes to the digital media player; and upon receiving a request for an original image file corresponding to a thumbnail selected by the digital media player from the digital media player, informing the digital media player of a URI of a corresponding original image file.

According to still another aspect of the present invention, an image management method by a digital media player in a DLNA system including a digital media server and the digital media player includes requesting the digital media server to transmit an image list; receiving a thumbnail group image, including at least one thumbnail, and an index from the media server; displaying the thumbnail group image, and if any one of thumbnails included in the thumbnail group image is selected, requesting the digital media server to transmit an original image file corresponding to the selected thumbnail; receiving a URI in which the original image file is stored from the digital media server; and downloading the original image file by accessing the URI.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF EMBODIMENTS OF THE PRESENT INVENTION

Reference will now be made in detail to the exemplary embodiments of the present invention with reference to the accompanying drawings. The following detailed description includes specific details in order to provide a thorough understanding of the present invention. However, it will be apparent to those skilled in the art that the present invention may be practiced without such specific details.

Figure 1:
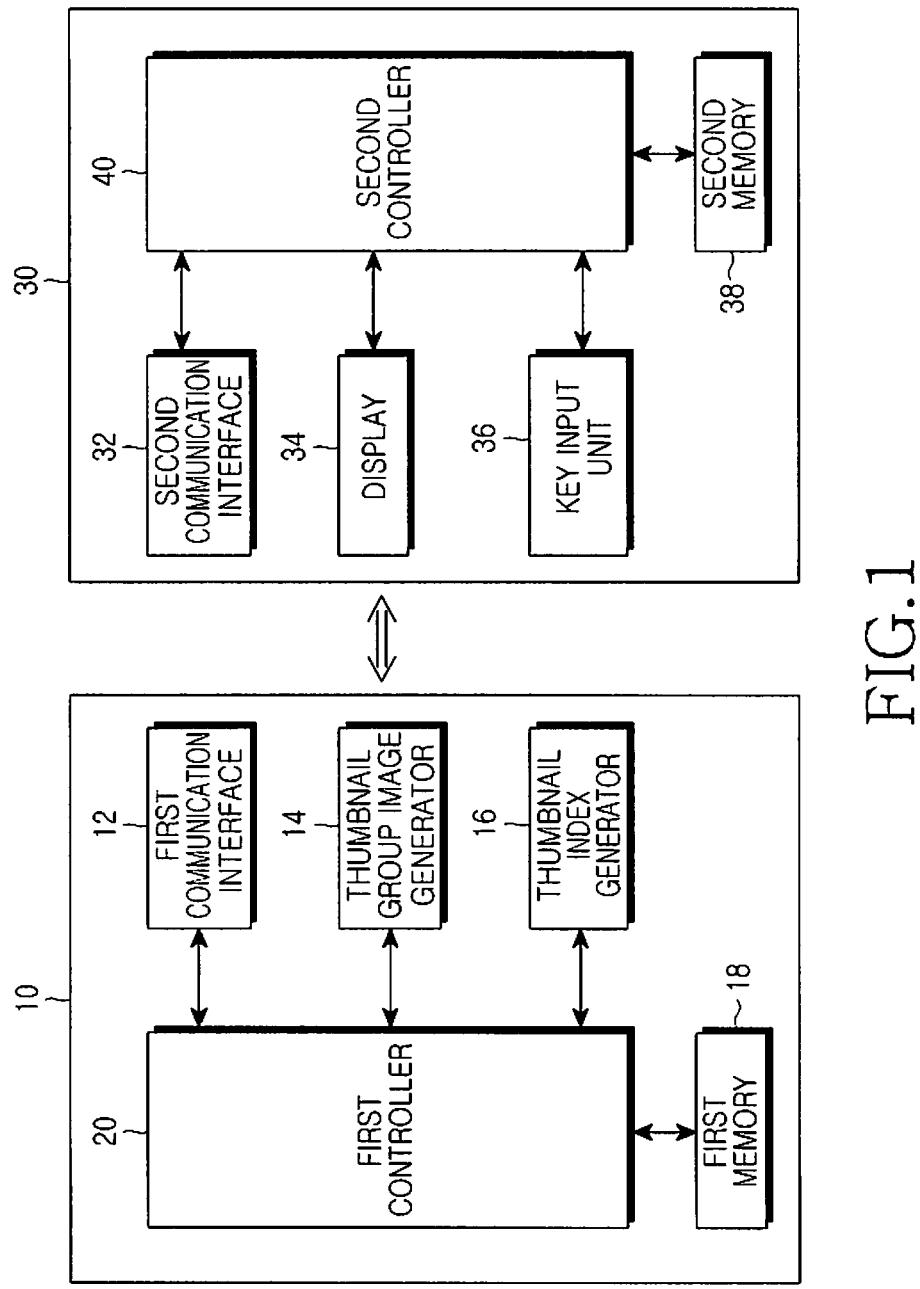
FIG. 1 is a block diagram illustrating a schematic configuration of a DLNA system according to an embodiment of the present invention.

FIG. 1 is a block diagram illustrating a schematic configuration of a DLNA system according to an embodiment of the present invention. The DLNA system includes a digital media server (hereinafter, referred to as a "media server") 10 and a digital media player (hereinafter, referred to as a "player") 30. The media server 10 provides an image list comprised of thumbnails to the player 30. The player 30 receives the image list from the media server 10 and displays the image list. The player 30 may select one of the thumbnails included in the image list through user input. If a thumbnail is selected by the player 30, the media server 10 transmits a URI of an original image file corresponding to the selected thumbnail to the player 30. The player 30 accesses the URI received from the media server 10 and downloads the original image file.

The media server 10 includes a first communication interface 12, a thumbnail group image generator 14, a thumbnail index generator 16, a first memory 18, and a first controller 20.

The first communication interface 12 communicates with the player 30. The first communication interface 12 may transmit a URI of an original image file corresponding to each thumbnail to the player 30. In this case, the first communication interface 12 may transmit a message including a URI of an original image file to the player 30 under the control of the first controller 20.

The thumbnail group image generator 14 generates a thumbnail group image. The thumbnail group image refers to one image generated by combining a plurality of thumbnails together. The thumbnail group image generator 14 may generate thumbnails corresponding respectively to original images stored in the first memory 18. The thumbnail group image generator 14 generates thumbnails by reducing the size of an original image and generates a thumbnail group image by combining the generated thumbnails together.

The thumbnail index generator 16 generates an index corresponding to each thumbnail of the thumbnail group image generated by the thumbnail group image generator 14. The index may include information about a thumbnail group image as well as a name and coordinates of a thumbnail. The following Table 3 illustrates an example of an index according to an embodiment of the present invention.

TABLE 3

<item id="XX" parentID="YY" restricted="false">
<dc:title>image #5</dc:title>
<res importUri="http://a.b.c.d/~abc/image.jpg" protoclInfo="*.*:image:JPEG"/>
<res importUri="http://a.b.c.d/~abc/160/320/thumbnail_group.jpg" protoclInfo="*.*:image:JPEG"/>
</item>

In Table 3, 'importUri' indicates a URI of a thumbnail group image and 'protocolInfo' indicates a file format of a thumbnail group image. In Table 3, the URI of the thumbnail group image is 'http://a.b.c.d/~abc/160/320/thumbnail_group.jpg' and the file format is 'JPEG'.

The first memory 18 may be a program memory or a data memory. The first memory 18 stores information necessary to control the operation of the media server 10. A thumbnail group image and an index corresponding to each thumbnail included in the thumbnail group image may be stored in the first memory 18. Further, the first memory 18 stores a URI of an original image file corresponding to each thumbnail included in the thumbnail group image.

The first controller 20 controls the overall operation of the media server 10. The first controller 20 controls the thumbnail group image generator 14 to generate a thumbnail group image and controls the thumbnail index generator 16 to generate an index corresponding to each thumbnail included in a thumbnail group image. If information (e.g., an index) about a thumbnail selected by the player 30 from a thumbnail group image is transmitted to the first controller 20 through the first communication interface 12 of the media server 10, the first controller 20 may generate a message including a URI of an original image file of the thumbnail selected by the player 30 and may transmit the message to the player 30 through the first communication interface 12.

The player 30 includes a second communication interface 32, a display 34, a key input unit 36, a second memory 38, and a second controller 40.

The second communication interface 32 performs a communication function of the player 30. The second communication interface 32 receives a thumbnail group image and an index corresponding to each thumbnail included in the thumbnail group image from the media server 10. The second communication interface 32 transmits, to the media server 10, information about a thumbnail selected from a thumbnail group image through the key input unit 36. If a message including a URI of an original image file corresponding to a thumbnail is received from the media server 10, the second communication interface 32 may access the URI and may download the original image file.

The display 34 displays a thumbnail group image upon receiving the thumbnail group image through the second communication interface 32.

The key input unit 36 receives user input for selecting any one of thumbnail group images displayed through the display 34.

The second memory 38 may be a program memory or a data memory, like the first memory 18. The second memory 38 stores information necessary to control the operation of the player 30. A thumbnail group image and an index received from the media server 10 are stored in the second memory 38.

Further, the second memory 38 may store an original image file corresponding to a thumbnail selected by the key input unit 36, etc.

The second controller 40 controls the overall operation of the player 30. The second controller 40 controls the second communication interface 32 to request the media server 10 to transmit a thumbnail group image and controls the display 34 to display the thumbnail group image received through the second communication interface 32. If any one of the thumbnails included in the thumbnail group image is selected, the second controller 40 confirms an index corresponding to the selected thumbnail. The second controller 40 controls the second communication interface 32 to request the media server 10 to transmit an original image file corresponding to the selected thumbnail. If a message including a URI of the original image file of the corresponding thumbnail is received from the media server 10, the second controller 40 controls the second communication interface 32 to access the URI and to download the original image file.

Figure 2:
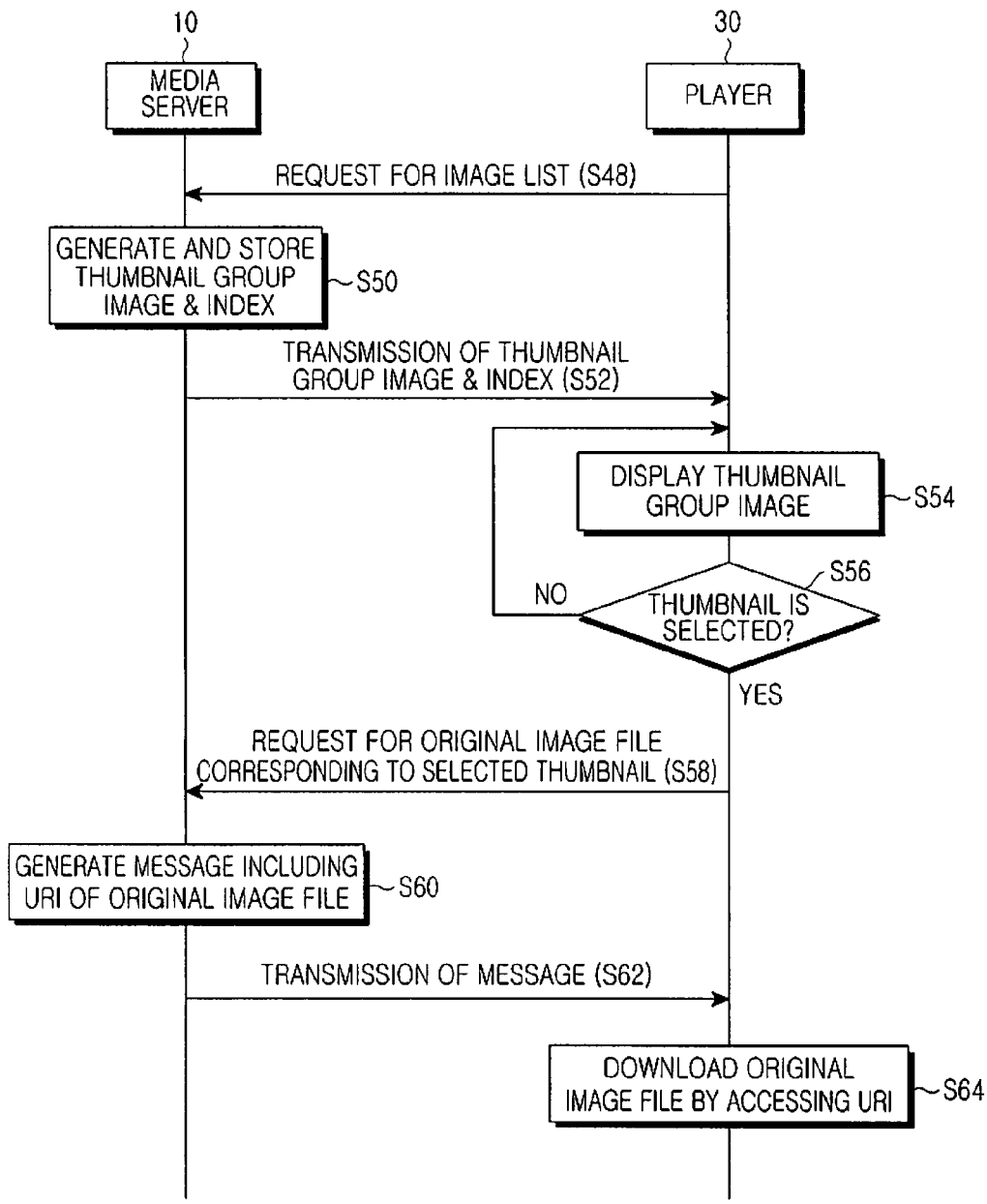
FIG. 2 is a flow diagram illustrating an image management method in a DLNA system according to an embodiment of the present invention.

FIG. 2 is a flow diagram illustrating an image management method in a DLNA system according to an embodiment of the present invention.

The player 30 requests the media server 10 to transmit an image list at step S48. The media server 10 generates a thumbnail group image and an index corresponding to each thumbnail included in the thumbnail group image and stores the thumbnail group image and the index in the first memory 18 at step S50. The media server 10 transmits the thumbnail group image and index generated in step S50 to the player 30 at step S52.

The player 30 displays the thumbnail group image at step S54 and determines whether a thumbnail is selected at step S56. If no thumbnails are selected, the player 30 displays the thumbnail group image at step S54 and enters a standby state until a thumbnail is selected. If a thumbnail is selected, for example through the key input unit 34, the player 30 confirms the selected thumbnail. The player 30 may know an index corresponding to the selected thumbnail by confirming coordinates of the selected thumbnail. Moreover, the second controller 40 of the player 30 may know information such as a name of the selected thumbnail by confirming the index of the selected thumbnail.

The player 30 requests the media server 10 to transmit an original image file corresponding to the selected thumbnail at step S58. The player 30 may inform the media server 10 of information about the selected thumbnail by transmitting coordinate information or a name of the selected thumbnail to the media server 10

The media server 10 confirms the thumbnail selected by the player 30 and generates a message including a URI of an original image file corresponding to the selected thumbnail at step S60. In this embodiment, it is assumed that the media server 10 does not transmit, to the player 30, the original image file corresponding to each thumbnail but transmits an address of a web server on which the original image file is stored. Accordingly, upon receiving a request for the original image file from the player 30, the media server 10 informs the player 30 of an address, that is, a URI of a web server on which a corresponding image file is stored. Namely, the media server 10 informs the player 30 of a URI.

The media server 10 transmits the message generated in step S60 to the player 30 to inform the player 30 of the URI of the original image file corresponding to the thumbnail selected by the player 30 at step S62. The player 30 then downloads the original image file by accessing a corresponding URI at step S64.

Figure 3:
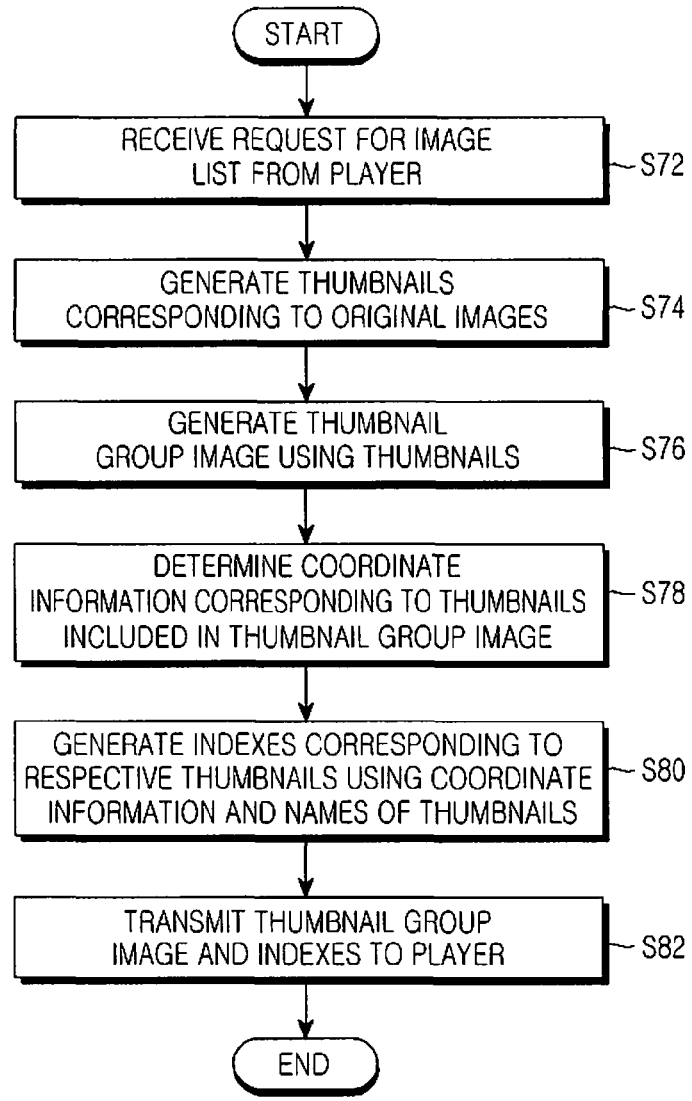
FIG. 3 is a flow chart illustrating a method for a media server to provide a thumbnail group image to a player in a DLNA system according to an embodiment of the present invention.

FIG. 3 is a flow chart illustrating a method for a media server to provide a thumbnail group image to a player in a DLNA system according to an embodiment of the present invention.

In this embodiment, it is assumed that the media server 10 has previously stored an original image file in the first memory 18. The media server 10 receives a request for an image list from the player 30 at step S72. The image list refers to a list of images which can be provided to the player 30 by the media server 10.

The media server 10 generates thumbnails corresponding to original images at step S74. Here, the thumbnail group image generator 14 of the media server 10 generates the thumbnails under the control of the first controller 20. The thumbnail group image generator 14 generates each thumbnail by reducing a size of a previously stored original image. For example, if an original image is 1800×1200 pixels in size, the thumbnail group image generator 14 may generate a thumbnail by reducing the size of the original image to a size of 150×100 pixels. In this case, it is assumed that the size of the thumbnail is a value stored previously in the first memory 18.

The media server 10 generates a thumbnail group image using the thumbnails generated in step S74 at step S76. The media server 10 may generate the thumbnail group image by sequentially combining the thumbnails together. For example, if the thumbnail group image is constructed by a 5×7 array of thumbnails, the thumbnail group image generator 14 of the media server 10 generates the thumbnail group image by combining 5 thumbnails in a horizontal axis and 7 thumbnails in a vertical axis in a matrix form.

The media server 10 determines coordinate information corresponding to the respective thumbnails included in the thumbnail group image at step S78. The media server 10 generates indexes corresponding to the respective thumbnails, using the coordinate information and names of the thumbnails at step S80.

The media server 10 transmits the thumbnail group image and the indexes to the player 30 at step S82.

Although this embodiment has described the media server which generates the thumbnails and the thumbnail group image upon receiving the image list request from the player 30, the media server 10 may previously store the thumbnails or the thumbnail group image in the first memory 18. Moreover, the media server 10 may previously store the indexes corresponding to the thumbnail group image in the first memory 18 in addition to the thumbnail group image.

Figure 4:
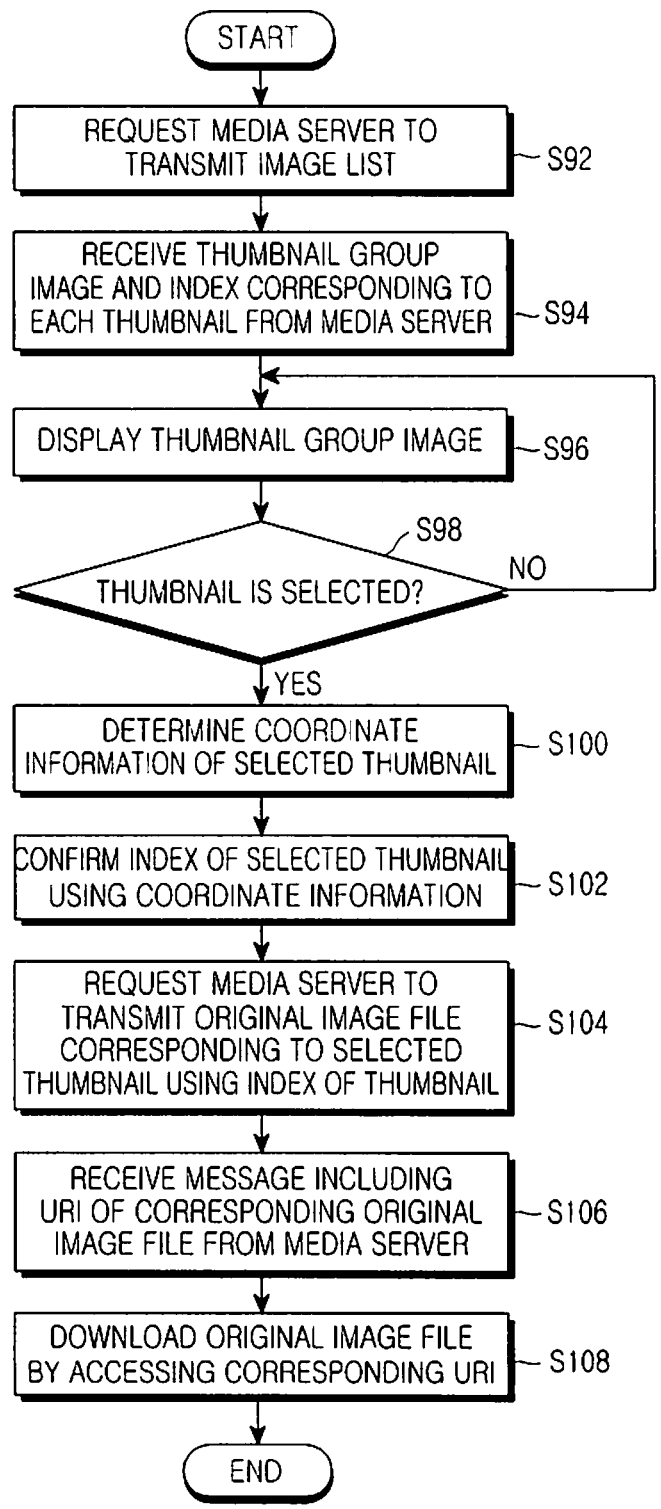
FIG. 4 is a flow chart illustrating a method for a player to receive an original image file from a media server in a DLNA system according to an embodiment of the present invention.

FIG. 4 is a flow chart illustrating a method for a player to receive an original image file from a media server in a DLNA system according to an embodiment of the present invention.

The player 30 requests the media server 10 to transmit an image list at step S92. The player 30 receives a thumbnail group image and an index corresponding to each thumbnail from the media server 10 at step S94 and displays the thumbnail group image at step S96.

The second controller 40 of the player 30 determines whether a thumbnail is selected at step S98. If no thumbnails are selected, the player 30 displays the thumbnail group image at step S96 and enters a standby state. If any one of the thumbnails included in the thumbnail group image is selected, the second controller 40 of the player 30 determines coordinate information of the selected thumbnail at step S100. The player 30 confirms an index of the selected thumbnail using the coordinate information at step S102.

The index received in step S94 includes coordinate information about each thumbnail and includes a name of each thumbnail. Therefore, if the coordinate information is determined, the player 30 can know information such as a thumbnail name corresponding to the coordinate information with reference to the index.

The player 30 requests the media server 10 to transmit an original image file corresponding to the selected thumbnail using the index of the thumbnail at step S104. In this case, the player 30 may inform the media server 10 of a request for a corresponding original image file by transmitting the coordinate information or name of the selected thumbnail to the media server 10.

The player 30 receives a message including a URI of the corresponding original image file from the media server 10 at step S106 and then downloads the original image file by accessing a corresponding URI at step S108.

Figure 5A:
FIG. 5A is a diagram illustrating a thumbnail group image in a DLNA system according to an embodiment of the present invention.
Figure 5B:
FIG. 5B is a diagram illustrating thumbnails and indexes corresponding to the thumbnails according to an embodiment of the present invention.
Figure 5C:
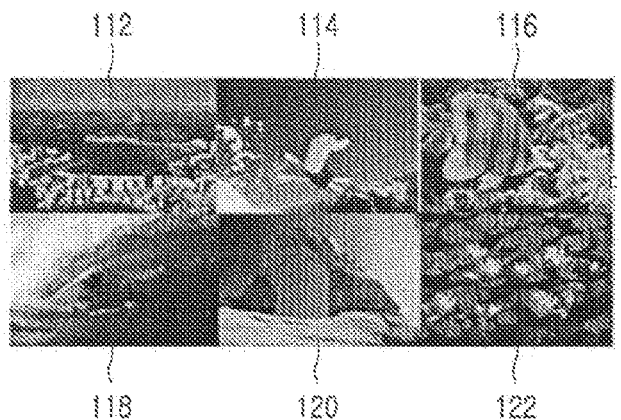
FIG. 5C is a diagram illustrating a thumbnail group image displayed in a player according to an embodiment of the present invention.

FIG. 5A is a diagram illustrating a thumbnail group image in a DLNA system according to an embodiment of the present invention, FIG. 5B is a diagram illustrating thumbnails and indexes corresponding to the thumbnails, and FIG. 5C is a diagram illustrating a thumbnail group image displayed in a player.

Referring to FIG. 5A, a thumbnail group image generated by the media server 10 is shown. The thumbnail group image of FIG. 5A is comprised of 9 thumbnails thum #1, thum #2, thum #3, thum #4, thum #5, thum #6, thum #7, #8, and thum #9. The thumbnail group image generator 14 may generate the thumbnails each having the same size and may generate the thumbnail group image by combining the thumbnails together.

FIG. 5B illustrates indexes of partial thumbnails of the thumbnail group image shown in FIG. 5C. A thumbnail group image of FIG. 5C includes 6 thumbnails 112, 114, 116, 118, 120, and 122. Thumbnails shown in FIG. 5B have names of 'Image #1', 'Image #2', and 'Image #3' and coordinate information of 'Offset 0,0', 'Offset 160,0', and 'Offset 0,160'.

Although exemplary embodiments of the present invention have been disclosed for illustrative purposes, various modifications, additions and substitutions are possible, without departing from the scope and spirit of the invention as disclosed in the accompanying claims. Accordingly, the scope of the present invention should not be limited to the description of the embodiment, but defined by the accompanying claims and equivalents thereof.

What is claimed is:

1. A digital media server in a wireless network comprising:
   a thumbnail group image generator configured to:
      generate thumbnails by reducing size of at least one original image file, and
      generate a thumbnail group image by combining the thumbnails together;
   a thumbnail index generator configured to generate indexes for the thumbnails corresponding to the at least one original image file;
   a communication interface configured to:
      when a first request for an image list of the at least one original image file is received from a digital media player, transmit the thumbnail group image and the indexes to the digital media player, and
      when any thumbnail included in the thumbnail group image is selected, receive a second request to transmit an original image file corresponding to the selected thumbnail from the digital media player; and
   a controller configured to:
      determine the original image file corresponding to the selected thumbnail from the digital media player, and
      generate a message including a Uniform Resource Identifier (URI) of the original image file corresponding to the selected thumbnail, in response to the second request from the digital media player, and control the communication interface to transmit the message to the digital media player;

wherein the digital media player receives the message, accesses the URI included in the message, and downloads the original image file.

2. The digital media server according to claim 1, wherein the digital media player generates the thumbnails corresponding to the at least one original image file and generates the thumbnail group image by combining the thumbnails together.

3. The digital media server according to claim 1, wherein each of the indexes includes coordinate information of each of the thumbnails included in the thumbnail group image and includes a name of each thumbnail corresponding to the coordinate information.

4. The digital media server according to claim 3, wherein the digital media player determines coordinate information of the selected thumbnail and transmits the second request including the coordinate information or the name of the thumbnail corresponding to the coordinate information.

5. The digital media server according to claim 4, wherein the controller determines the original image file requested using the coordinate information or the name of the thumbnail.

6. An image management method of a digital media server in a wireless network, the method comprising:

generating thumbnails by reducing a size of at least one original image file;

generating a thumbnail group image by combining the thumbnails;

generating indexes for the thumbnails corresponding to the at least one original image file;

when a first request is received for an image list of the at least one original image file from a digital media player, transmitting the thumbnail group image and the indexes to the digital media player;

when any thumbnail included in the thumbnail group image is selected, receiving a second request to transmit an original image file corresponding to the selected thumbnail from the digital media player;

generating a message including the Uniform Resource Identifier (URI) of the requested original image file, in response to the second request from the digital media player; and transmitting the message to the digital media player, wherein the digital media player receives the message, accesses the URI included in the message, and downloads the requested original image file.

7. The image management method according to claim 6, further comprising, before generating the thumbnail group image:

receiving a request to transmit an image list of the at least one original image file from the digital media player.

8. The image management method according to claim 6, wherein the indexes include coordinate information of each of the thumbnails included in the thumbnail group image and includes a name of each thumbnail corresponding to the coordinate information.

9. The image management method according to claim 8, wherein transmitting the thumbnail group image and the indexes to the digital media player includes:

when the coordinate information of the selected thumbnail is determined by the digital media player, receiving the second request to inform the digital media player of the coordinate information or the name of the thumbnail corresponding to the coordinate information.

10. The image management method according to claim 9, before generating the message, further comprising:

determining the original image file requested using the coordinate information or the name of the thumbnail.

* * * * *